Patented Feb. 26, 1929.

1,703,755

UNITED STATES PATENT OFFICE.

ARTHUR STOLL, OF ARLESHEIM, NEAR BASEL, AND WALTER KUSSMAUL, OF BASEL, SWITZERLAND, ASSIGNORS TO THE FIRM CHEMICAL WORKS FORMERLY SANDOZ, OF BASEL, SWITZERLAND.

OXIDATION OF ALDOSES.

No Drawing. Application filed June 18, 1928, Serial No. 286,482, and in Germany July 2, 1927.

In the U. S. patent specification No. 1,648,368 a process for the oxidation of aldoses to the corresponding monocarboxylic acids is described and claimed, which refers to the treatment of sugars in an alkaline solution with hypochlorites in the presence of bromine or iodine salts. According to this process, good yields are only obtained if the mixture is very cautiously cooled during the oxidation. This can be sufficiently effected by the addition of ice. By this addition, however, the solutions of the reaction products become strongly diluted and must be concentrated to a large extent for the crystallization of the monocarboxylic acids, for instance in form of their calcium salts.

It has now been found that the oxidation of the aldoses to the corresponding monocarboxylic acids can also be carried out at elevated temperatures, which make it possible to avoid dilute solutions obtained by cooling the mixture with ice, if the process is carried out by treating the aldoses with chlorine, in the presence of a salt of bromine or iodine ($\frac{1}{10}$ equivalent), in a solution containing alkali carbonate.

It is known that when sugars are oxidized with chlorine alone, namely without the addition of a salt of bromine or iodine, the reaction proceeds quite irregularly, a certain part of the sugar is degraded even so far as to oxalic acid and to carbon dioxide, whilst unaltered sugar is still present.

According to a process of Ling and Nanji (Journ. Soc. Chem. Ind. 41, p. 28–29, 1922) the oxidation of aldoses is performed by treating sugars with chlorine in the presence of about $\frac{1}{4}$ equivalent of calcium bromide and by neutralizing the formed hydrochloric acid by gradual addition of calcium carbonate. The process of Ling and Nanji shows various drawbacks, when compared with the present one. It involves the use of comparatively large quantities of the expensive bromine and requires an acid proof apparatus, since the reaction liquid becomes acid. Further the large quantities of calcium chloride formed are very troublesome, the crystallization of the gluconate of calcium, for instance, being rendered exceedingly difficult or even practically impossible by this admixture.

In the present process, however, it will be sufficient to add, during the oxidation, the quantity of calcium carbonate necessary to neutralize, for instance, the gluconic acid formed, whereby the desired salt separates in a good yield, because the alkali chlorides formed do not interfere with the crystallization. The main quantity of the hydrochloric acid formed during the oxidation is neutralized by the alkali carbonate.

The monocarboxylic acids can also be isolated in form of their calcium salts in the following modified manner.

The oxidation is carried out without the addition of calcium carbonate, and the alkali salts of the monocarboxylic acids thus formed are allowed to react with the equivalent quantity of calcium chloride, when the oxidation is achieved.

The improved process allows to effect the oxidation of the aldoses in such a manner that the monocarboxylic acids formed can easily be obtained as crystallized salts in one single operation, without evaporating, precipitating or filtering. This represents a considerable technical progress.

The following example illustrates the improved process:

Example 1.

180 g. of lactose, 7,5 g. of sodium iodide and 8 g. of sodium carbonate are dissolved in 200 ccm. of water and the solution is heated to about 50° C. Into this solution chlorine is introduced under vigorous stirring. During the operation 73 g. of sodium carbonate are added by little portions in order to maintain an alkali carbonate alkaline reaction. The addition of sodium carbonate is increased, as soon as bromine vapours appear on the surface of the liquid, so as to avoid a loss of bromine; further it is necessary to adapt the current of chlorine to the consumption. The chlorine current is interrupted when the sodium carbonate is consumed and the solution is subsequently exactly neutralized. 100 g. of calcium chloride, corresponding to the amount of lactobionic acid formed (slight excess) are then added and after some time the double compound of lactobionate of calcium and calcium chloride crystallizes in a good yield.

*Example 2.*

To 100 g. of glucose, dissolved in 200 ccm. of water, 5 g. of sodium bromide and 5 g. of sodium carbonate are added and the solution is heated to about 50–55° C. Into this solution chlorine in form of a not too rapid a current is introduced, under stirring. During this operation a mixture of 50 g. of sodium carbonate and 25 g. of calcium carbonate is added by little portions in order to maintain a permanent alkali carbonate alkaline reaction. Chlorine is introduced until the solution becomes clear, that is until the whole of the calcium carbonate is dissolved, and subsequently an eventual slight acid reaction is exactly neutralized by the addition of calcinated sodium carbonate. On standing the gluconate of calcium crystallizes and can be purified by recrystallization.

What we claim is:

1. A process for the oxidation of aldoses to the corresponding monocarboxylic acids, consisting in treating the sugars in an alkali carbonate alkaline solution with chlorine in the presence of a salt of a halogen with higher molecular weight than chlorine.

2. A process for the oxidation of aldoses to the corresponding monocarboxylic acids, consisting in treating the sugars in an alkali carbonate alkaline solution with chlorine in the presence of a salt of bromine.

In witness whereof we have hereunto signed our names this 7th day of June, 1928.

ARTHUR STOLL.
WALTER KUSSMAUL.